(No Model.)
W. H. RUSHFORTH.
FEED WATER HEATER.
No. 318,880. Patented May 26, 1885.
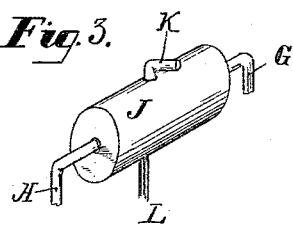
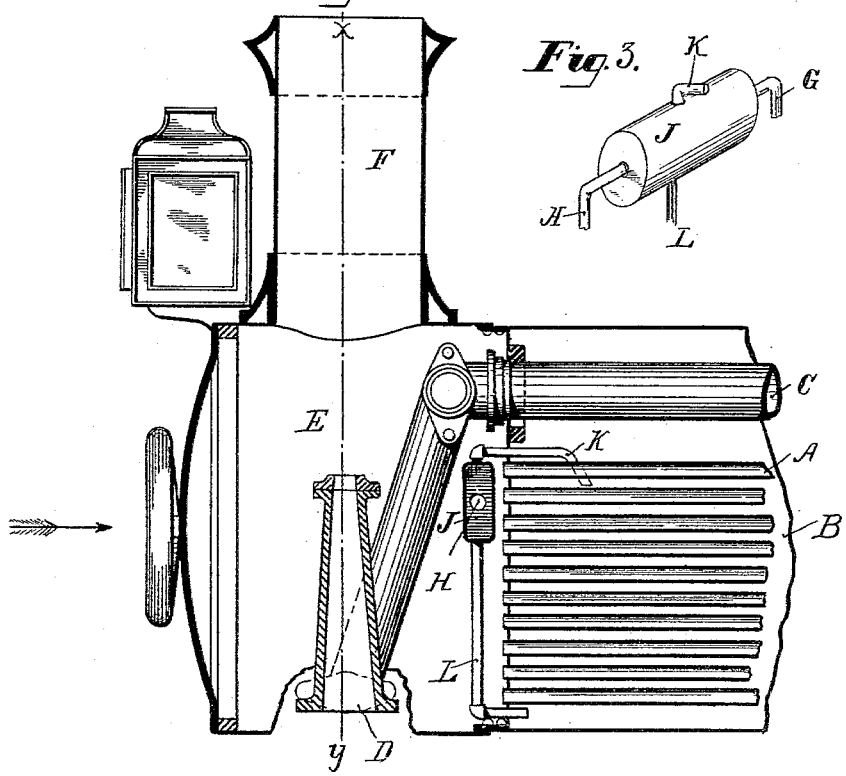
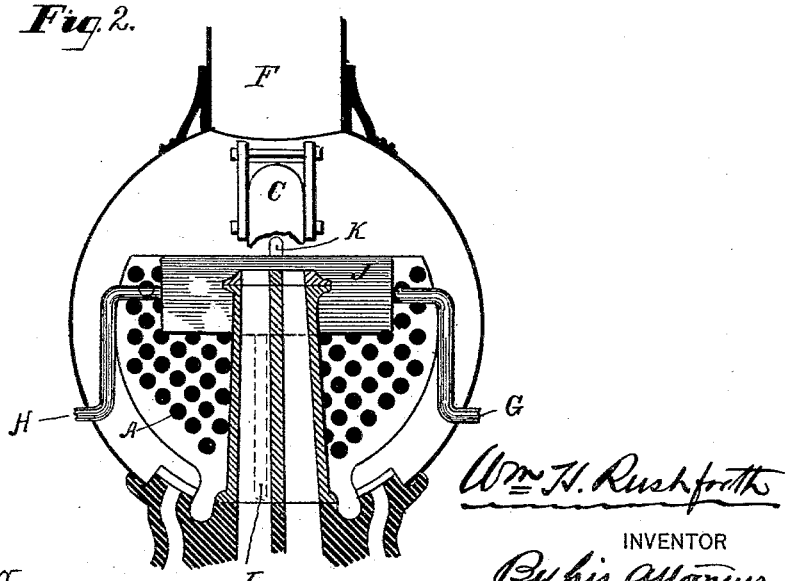
WITNESSES:
INVENTOR
Wm. H. Rushforth
By his Attorneys,

United States Patent Office.

WILLIAM HENRY RUSHFORTH, OF CAMDEN, NEW JERSEY.

FEED-WATER HEATER.

SPECIFICATION forming part of Letters Patent No. 318,880, dated May 26, 1885.

Application filed May 23, 1884. Renewed May 4, 1885. (No model.)

*To all whom it may concern:*

Be it known that I, WILLIAM HENRY RUSHFORTH, a resident of Camden, in the county of Camden and State of New Jersey, have invented a new and useful Improvement in Feed-Water Heaters for Locomotive or Stationary Engine Boilers, of which the following is a specification.

The object of my invention is to provide means whereby the water supplied to the boiler may be heated before being fed thereto by the utilization of the waste heat heretofore unemployed for any useful purpose.

As is well known, in the usual method of supplying locomotive or other engine boilers with water from the tank, water of the temperature of the atmosphere is forced directly into the same, whereby the temperature of the boiler is reduced and a temporary stoppage of the generation of steam, as well as a destruction of generated steam, caused, with the result that the motive power of the locomotive or engine is temporarily and to a large degree lowered, the working of the engine rendered inconstant, and the consumption of a large amount of fuel to restore the requisite pressure of steam rendered necessary.

My invention consists in carrying the water pipe or pipes through which water is conveyed from the tank to the boiler to and through the smoke-box, and then causing them to discharge into the boiler, whereby the waste heat of the smoke-box is utilized in heating the water before its injection into the boiler.

In the drawings, Figure 1 is a longitudinal central sectional elevation of part of a locomotive provided with my improvement. Fig. 2 is a front sectional elevation on the line *x y* of Fig. 1, and Fig. 3 is a detail view showing such parts of my device as are located within the smoke-box.

In the drawings, A represents the boiler-tubes; B, the boiler; C, a steam-pipe leading from the throttle-valve to the steam-chest; D, the exhaust-pipe; E, the smoke-box; and F the smoke-stack, all said parts being of usual and ordinary construction.

H and G are water-feed pipes leading from the water-tank to and partly located within the smoke-box E. In the drawings these pipes are shown as terminating in a water-drum, J, which is provided with pipes K and L, which, respectively, open and empty into the boiler at or near the top and bottom thereof.

Such being the construction of my invention, its mode of operation will be readily understood. Water being forced in any usual manner from the water-tank through the pipes G and H to the drum J escapes through the pipes K and L to the boiler, it first having attained a high degree of temperature by the exposure of the parts through which it is carried to the heat of the smoke-box E.

When the pump or injector by which the water is forced from the tank to the boiler is stopped or thrown out of operation, a circulation is induced from the boiler through the pipes H and K by the heat of the smoke-box, whereby these pipes, as well as the drum J, are kept filled with water and their destruction by the heat of the smoke-box prevented.

I do not confine myself to the exact construction shown in the drawings, as it is evident that a drum, coil, or other receptacle provided with pipes emptying into the boiler at points respectively near the top and bottom thereof may be employed instead of the drum J hereinbefore described without departing from my invention.

It will be readily seen that the use of my invention will, by the employment of the heretofore unused and waste heat of the smoke-box of a locomotive or other engine, obviate the destruction of steam, as well as the temporary suspension of the production of steam, incident to the introduction of cold water to the boiler, and will increase the constancy of operation of a locomotive, and therefore to a large extent decrease the consumption of fuel.

Having thus described my invention, I claim—

In a locomotive or other engine, in combination, a water feed pipe or feed pipes leading from the water-tank to or terminating in a water-drum so located in a smoke-box as to be surrounded by the heat thereof, two or more pipes leading from said coil or drum to and emptying into the boiler below the water-line and at points at or near the top and bottom thereof, respectively.

In testimony whereof I have hereunto signed my name this 22d day of May, A. D. 1884.

WILLIAM HENRY RUSHFORTH.

In presence of—
J. BONSALL TAYLOR,
W. C. STRAWBRIDGE.